INVENTORS
J.D. RATJE
H.W. TOMPKINS

BY

ATTORNEYS

United States Patent Office 3,216,212
Patented Nov. 9, 1965

3,216,212
CRYSTALLIZATION APPARATUS
John D. Ratje, Gallup, N. Mex., and Harold W. Tompkins, Phillips, Tex., assignors to Phillips Petroleum Company, a corporation of Delaware
Original application Apr. 3, 1957, Ser. No. 650,419, now Patent No. 3,093,649, dated June 11, 1963. Divided and this application July 27, 1962, Ser. No. 212,822
6 Claims. (Cl. 62—123)

This is a divisional application of our copending application Serial No. 650,419, filed April 3, 1957, now Patent No. 3,093,649.

This invention relates to the separation and purification of components of liquid multi-component mixtures. In one aspect, it relates to the separation and purification of components of a liquid multi-component mixture by fractional crystallization. In another aspect, it relates to means for controlling the solids content of a slurry supplied to the purification column of fractional crystallization apparatus. In still another aspect, it relates to a method for controlling the solids content of a chiller used in fractional crystallization apparatus.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities, or materials having relatively high boiling ranges, or thermal unstable substances, separation by crystallization may be the only method which can be advantageously employed.

As well as offering in many cases perhaps the only practicable method of separation, the crystallization method offers the further advantage of being the only separation method which theoretically gives a pure product in a single stage of operation. In actual practice, however, the crystals obtained from a solution of several components will be impure because of the occlusion of mother liquor within the crystal interstices. In the conventional fractional crystallization processes, the crystal yield from one-batch crystallization is redissolved in a solvent or remelted and again crystallized to effect further purification. The recrystallized product will have less impurities since the concentration of impurity in the new liquor is less than in the previous liquor of crystallization. Such processes require a large amount of equipment and floor space for their operation with resulting high operating exepnditures in terms of labor and equipment costs. Furthermore, in these types of processes, the purity of the product is limited by the number of stages through which the process is carried.

More recently, a continuous method of separating and purifying liquid multi-component mixtures has been advanced which overcomes the disadvantages of conventional fractional crystallization processes. This method involves cooling a liquid multi-component mixture from which the separation is to be made so as to form crystals of at least the higher melting component and thereafter supplying the resulting slurry to a crystal separation and purification column. In this column, crystals are separated from mother liquor and then introduced into a purification section in one end of which a melting section is maintained. The crystals are moved through the purification section toward the melting section where the crystals are melted, and a portion of the melt is withdrawn as product. The remainder of the melt is displaced countercurrently to the movement of crystals and in intimate contact therewith so as to remove occluded impurities.

When practicing the above-described crystal separation and purification method, it has been found to be desirable to supply to the separation and purification column a slurry which has a constant solids content. When operating in this manner, the production of a high purity product in high yields is greatly facilitated. It also makes possible a steady operating procedure in which fluctuations in product yield and product purity are reduced to a minimum. Furthermore, when practicing the above-described method, it is often desirable to maintain the solids content of the slurry as high as possible while still producing a slurry which is capable of flowing. In order to maintain a high solids content slurry, close control over the refrigeration process whereby the solids are formed is required. Several methods have been advanced for controlling the operation of the crystal forming means so as to provide a slurry having a constant solids content. One method proposes controlling the refrigeration requirements in accordance with the temperature of the slurry. However, this method has not been entirely satisfactory in systems in which there are large changes in solids content with small changes in temperature. In accordance with the instant invention, a method is provided for controlling the solids content of a chiller slurry, which can be advantageously used with all systems, particularly with those exhibiting large changes in solids content with small changes in temperatures.

It is an object of this invention to provide improved fractional crystallization apparatus.

Another object of the invention is to provide an improved process for the separation of components of liquid multi-component mixtures.

Still another object of the invention is to provide fractional crystallization apparatus comprising an improved crystal forming means having associated therewith means for controlling the solids content of a crystal slurry.

Still another object of the invention is to provide apparatus for controlling the refrigeration requirements of a chiller in response to a measurement of the dielectric properties of the solids slurry formed in the chilller.

A further object of the invention is to provide an improved chiller which includes means for controlling the solids content of the slurry formed therein in response to a measurement of the dielectric properties of the slurry produced in the chiller.

A still further object of the invention is to provide a method for controlling the refrigeration requirements of a chiller so as to obtain a slurry having a desired solids content.

Other and further objects, advantages and features of the invention will become apparent to one skilled in the art upon consideration of the accompanying disclosure.

Broadly speaking, the present invention is directed to the separation and purification of components of liquid multi-component mixtures and involves controlling the operation of the chiller or crystallizer so as to provide a slurry having a desired constant solids content. The control method of this invention is based upon the discovery that the dielectric constant of a slurry obtained by cooling any given feed mixture is a function of the amount of solids contained in the slurry. In one embodiment, in a process which comprises passing a slurry of solids in mother liquor into a purification zone, separating mother liquor from the slurry within the purification zone, moving solids through the purification zone toward a melting zone, melting solids in the melting zone, displacing a portion of the resulting melt into the moving solids, and recovering a purified product from the melting zone, the invention resides in the improvement comprising measuring the dielectric properties of the slurry passed into the purification zone, and adjusting the solids content of the slurry in response to this measurement.

The process described herein can be advantageously employed in conjunction with practically any system to which fractional crystallization is applicable in order to increase the efficiency of the separation. Thus, the process and apparatus of this invention are applicable to a vast number of simple binary and complex multi-component systems. The invention is particularly applicable to the separation of hydrocarbons which have practically the same boiling points and are, therefore, difficult to separate by distillation. Where high boiling organic compounds are concerned, separation by distillation is often undesirable because many such compounds are unstable at high temperatures. One particular advantageous application of the process lies in its use with systems which exhibit large changes in solids content with small changes in temperature, e.g., with a mixture containing 85 mol per cent or more 2-methyl-5-vinyl-pyridine, with normal paraffins, or with a system containing a high percentage of water. In order to illustrate some of the systems to which the invention is applicable, the following compounds are grouped with respect to their boiling points:

| Group A | B.P., °C. | F.P., °C. |
|---|---|---|
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-Dimethylpentane | 79 | −125 |
| 3,3-Dimethylpentane | 86 | |
| Methyl ethyl ketone | 79.6 | −86.4 |
| Methyl propionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B.P., °C. | F.P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 100 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P., °C. | F.P., °C. |
|---|---|---|
| Toluene | 110.8 | −95 |
| Methylcyclohexane | 100.3 | −126.3 |
| 2,2,3,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |

| Group D | B.P., °C. | F.P., °C. |
|---|---|---|
| Aniline | 184.4 | −6.2 |
| Toluene | 110.8 | −95 |
| Benzene | 80.0 | 5.5 |

| Group E | B.P., °C. | F.P., °C. |
|---|---|---|
| Carbon tetrachloride | 77 | −22.8 |
| Chloroform | 61 | −63.5 |
| $CS_2$ | 46.3 | −108.6 |
| Acetone | 56.5 | −95 |

| Group F | B.P., °C. | F.P., °C. |
|---|---|---|
| Ortho-xylene | 144 | −27.1 |
| Meta-xylene | 138.8 | 47.4 |
| Para-xylene | 138.5 | 13.2 |

| Group G | B.P., °C. | F.P., °C. |
|---|---|---|
| Ortho-cymene | 175.0 | −73.5 |
| Meta-cymene | 175.7 | −25 |
| Para-cymene | 176.0 | −73.5 |

| Group H | B.P., °C. | M.P., °C. |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B.P., °C. | M.P., °C. |
|---|---|---|
| Ortho-nitrotoluene | 222.3 | −10.6 −4.1 |
| Meta-nitrotoluene | 231 | 15.5 |
| Para-nitrotoluene | 238 | 51.3 |

Mixtures consisting of any combination of two or more of the components within any one of the groups can be resolved by the process of the invention, as can mixtures made up of components selected from different groups. For example, benzene can be separated from a benzene-n-hexane or a benzene-n-heptane mixture in which the benzene is present in an amount greater than the eutectic concentration. In the same manner, para-xylene may be readily separated from a mixture of para- and meta-xylenes or from para-, meta-, or ortho-xylenes. Benzene can also be separated from a mixture thereof with toluene and/or aniline. Multi-component mixtures which can be effectively resolved so as to recover one or more of the components in subtsantially pure form include mixtures of at least two of 2,2-dimethylpentane, 2,4-dimethylpentane, and mixtures of at least two of carbon tetrachloride, chloroform, and acetone. The invention is also applicable to the separation of individual components from a system of cymenes.

This invention can also be utilized to purify naphthalene, hydroquinone (1,4-benzenediol), paracresol, para-dichlorobenzene, and such materials as high melting waxes, fatty acids, and high molecular weight normal paraffins. The invention can also be used to resolve a mixture comprising anthracene, phenanthrene, and carbazole. Furthermore, the invention can be used to separate durene (1,2,4,5-tetramethylbenzene) from $C_{10}$ aromatics.

It is not intended, however, to limit the invention to organic mixtures, but rather it is applicable to inorganic mixtures as well, and offers a practical method of separating two inorganic components between which solvates or hydrates are formed. Examples of inorganic systems to which this invention is applicable are those for the recovery of pure salts, such as ammonium nitrate, and of anhydrous salts from their hydrates.

In certain cases, it is also desirable to recover the mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple and tomato. It is also possible to concentrate vegetable juices and beverages such as milk, beer, wine, coffee and tea by this method. The desired degree of concentration can be closely controlled by varying the amount of liquid passed as reflux into the moving mass of crystals. This aspect of this invention is in general applicable in those instances where it is desired to increase the concentration of a solution by removing at least a portion of the solvent therefrom.

For a more complete understanding of the invention, reference may be had to the following description and the drawing, in which.

Figure 1:
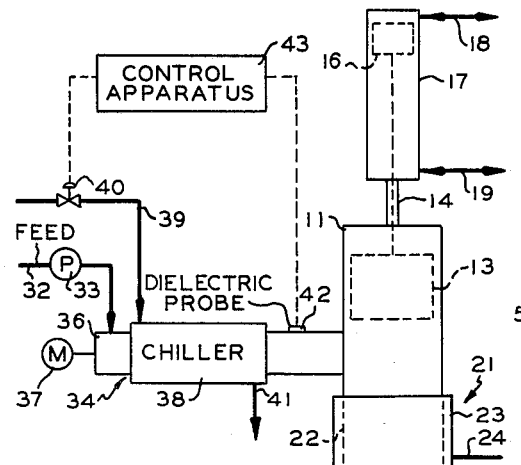
FIGURE 1 is an elevational view of fractional crystallization apparatus illustrating the present invention.

Referring to FIGURE 1 of the drawing, an elongated crystal and purification column 10 is closed at its upper and lower ends by closure members 11 and 12, respectively. The upper end of column 10 is provided with a compacting means, such as impervious piston 13, connected by a connecting rod 14 to a hydraulic piston 16 in hydraulic cylinder 17. Lines 18 and 19 serve to pass hydraulic fluid alternatively into and out of cylinder 17 so as to drive piston 16 which in turn causes the movement of piston 13. It is within the scope of the invention to use a porous piston, in which case the piston serves also as a filtering means. When operating the column with a porous piston, an outlet line is connected to the upper end of column 10 for removal of liquid therefrom. Filter section 21, disposed in an intermediate portion of column 10, comprises a filter medium, such as a filter screen 22, surrounded by jacket 23. Jacket 23 has a line 24 connected thereto for withdrawal of liquid from the filter section. The portion of column 10 below filter section 21 and in communication therewith comprises purification section 26. A heat exchange means is positioned in the lower end of column 10 in order to provide a crystal melting section in that end of the column. As illustrated, the heat exchange means is a coil 27 through which a heat transfer medium is circulated. However, it is not intended to limit the invention to the specific heating means shown, for other suitable means may be employed. For example, an electrical heater may be positioned next to closure member 12, a coil may be disposed around column 10 at its lower end, or an electrical bayonet type heater may be provided to extend into the end of the column. A liquid outlet line 29 provided with a valve 31 is connected to the end of column 10 to provide means for the removal of melt or a mixture of melt and crystals from the melting section.

Feed inlet line 32 leading from a source of feed material, not shown, and containing a pump 33 is connected to the inlet end of chiller 34. Chiller 34 may be any conventional type of refrigerating or crystal forming means such as a scraped surface chiller. As illustrated, the chiller comprises a cylindrical member 36 having positioned herein means for moving crystal slurry formed therein through the chiller, such as an auger connected to a motor 37. The cylindrical member is closed at its outer end while its other end is connected to column 10 at a point above filter section 21. Cylindrical member 36 is encompassed by a jacket 38 through which a coolant, such as a brine solution or an alcohol-water mixture, is continuously circulated by means of inlet line 39 and outlet line 41 connected to the jacket. Line 39 contains a flow control means, such as motor valve 40, to provide means for controlling the rate at which the coolant is introduced into the jacket. It is also within the scope of the invention to position this valve in outlet line 41. Thus, when the desired refrigeration is accomplished by the evaporation of a normally gaseous material, e.g., a light hydrocarbon, such as propane, valve 40 is positioned in line 41 to provide means for controlling the rate of evaporation.

In the operation of the apparatus of FIGURE 1, a liquid feed, which may be a liquid multi-component mixture containing components of different melting points, is pumped from a source, not shown, by pump 33 into chiller 34. Chiller 34 is maintained at a temperature low enough to crystallize a portion of one of the components and form a slurry of crystals in mother liquor. This is accomplished by circulating a suitable coolant through jacket 38 by means of lines 39 and 41. As discussed hereinbefore, it has been found that for improved operation of the crystal purification apparatus, it is important to provide a crystal slurry having a predetermined constant solids content. In accordance with the control method of this invention, the dielectric properties of the crystal slurry introduced into crystal purification column 10 are continuously measured by means of probe unit 42 inserted in cylindrical member 36. It is to be understand that the auger, in cylindrical member 36, does not extend into that portion of the cylindrical member in which the probe unit is disposed. The particular probe unit and the control apparatus 43 used in conjunction therewith is described in detail in copending U.S. patent application Serial No. 500,466, filed April 11, 1955, by W. D. Peters, and now issued as Patent No. 2,800,394. While it is not intended to limit the instant invention to any particular control apparatus and means for measuring the dielectric properties of the crystal slurry, the apparatus described in the cited patent application can be advantageously used in the practice of the instant invention.

Figure 2:
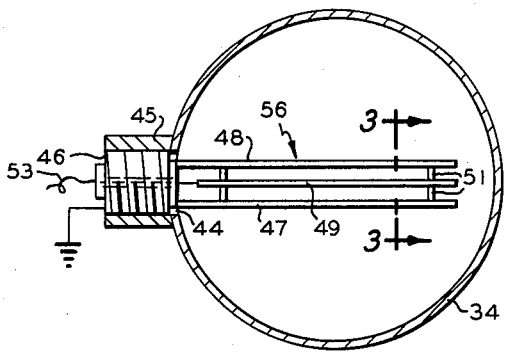
FIGURE 2 is a detailed view of the dielectric measuring probe used in the apparatus of FIGURE 1.
Figure 3:
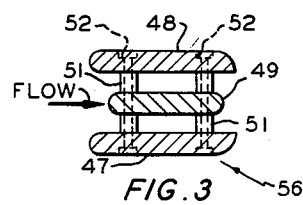
FIGURE 3 is a sectional view taken along line 3—3 of FIGURE 2.

Probe unit 42 is shown in detail in FIGURE 2 of the drawing. Cylindrical member 36 has an opening 44 in the side wall thereof which receives the dielectric probe unit. A threaded shoulder 45 which is attached to chiller 34 surrounds opening 44. The probe unit can be in the form of a base 46 which is threaded to shoulder 45. Base 46 supports a pair of spaced apart plates 47 and 48, which extend into cylindrical member 36. As illustrated in FIGURE 3, these plates can be streamlined to minimize resistance to the flow of slurry through the cylindrical member. Plates 47 and 48 are in electrical contact with base 46, which can be grounded electrically. A center plate 49 is mounted between plates 47 and 48 by electrically insulating spacers 51. The three plates are held in assembled relation by screws 52 which extend through spacers 51. An electrical lead 53 is attached to plate 49 and extends outwardly through an opening in base 46. To prevent leakage of material from cylindrical member 36, suitable sealing means are provided about base 46. Spaced plates 47, 48 and 49 thus form an electrical condenser wherein the slurry passed through cylindrical member 36 constitutes the dielectric material between the plates.

Figure 4:
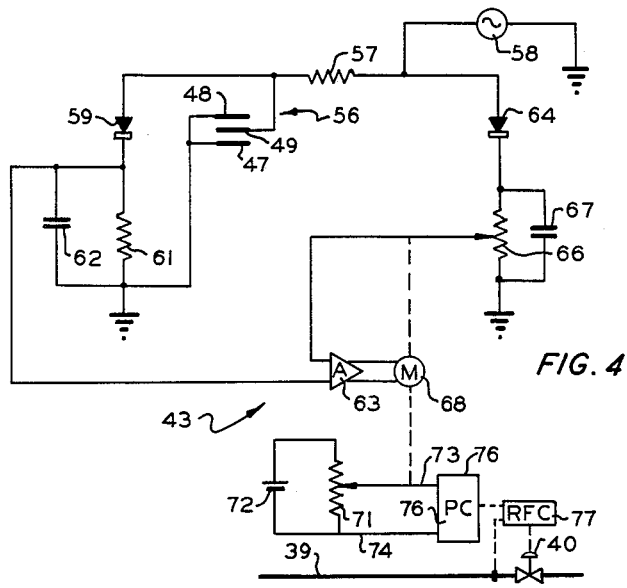
FIGURE 4 is a schematic representation of the control apparatus of FIGURE 1.

The dielectric properties of the slurry in cylindrical member 36 are measured by measuring the capacitance of the condenser formed by plates 47, 48 and 49. As shown in FIGURES 2 and 4, this unit is designated as capacitor 56. One terminal of capacitor 56 is connected to ground and the second terminal thereof is connected to the first terminal of a resistor 57 as seen in FIGURE 4, which shows the details of control apparatus 43 of FIGURE 1. The second terminal of resistor 57 is connected to the first terminal of a source of alternating current 58, the second terminal of which is grounded. A rectifier 59 and a resistor 61 are connected in series relation with one another and in parallel with capacitor 56. A capacitor 62 is connected in parallel with resistor 61. The junction between rectifier 59 and resistor 61 is connected to the first input terminal of an amplifier 63. A second rectifier 64 and a potentiometer 66 are connected in series relation with one another between the first terminal of current source 58 and ground. A capacitor 67 is connected in parallel with potentiometer 66. The contactor of potentiometer 66 is connected to the second input terminal of amplifier 63.

As thus far described, the circuit is a modified form of a Wheatstone bridge. Resistor 57 and capacitor 56 can be considered as constituting two arms of the bridge circuit while the upper and lower portions of potentiometer 66 can be considered as the other two arms of the bridge. Current source 58 is connected across the first opposite terminals of the bridge. Amplifier 63, which serves as a bridge unbalance indicator, is connected between the second opposite terminals of the bridge. Rectifiers 59 and 64 are provided to convert the alternating current bridge unbalance signal into a corresponding direct current which is applied to the input of amplifier 63. The output terminals of amplifier 63 are connected to a reversible servo motor 68, the drive shaft of which is mechanically coupled to the contactor of potentiometer 66. Amplifier 63 can include a converter in the input circuit thereof to convert the input direct current signal into a corresponding alternating signal. Servo motor 68 can be a reversible two phase motor which rotates in a first direction when a signal of first phase is applied thereto and rotates in a second direction when a signal 180 degrees out of phase with the first signal is applied thereto. Thus, any electric unbalance in the bridge circuit drives motor 68 in a direction so that the contactor of potentiometer 66 is moved until the unbalance signal is again zero. Any change in the dielectric properties of the slurry in cylindrical member 36 thus results in the movement of the contactor of potentiometer 66. The magnitude and direction of this movement are functions of the direction of and the magnitude of the change of the dielectric properties of the slurry flowing through cylindrical member 36.

The drive shaft of motor 68 is also mechanically coupled to the contactor of potentiometer 71. A voltage source 72 is connected across the end terminals of potentiometer 71. The contactor and one end terminal of potentiometer 71 are connected by respective leads 73 and 74 to the input terminals of a potentiometer controller 76. Controller 76 provides an output air pressure representative of the electrical signal applied thereto. This air pressure resets a rate of flow controller 77 which adjusts valve 40 in coolant inlet line 39 of FIGURE 1 in response to the rotation of motor 68. It is to be understood that the air signal from controller 76 can be used, if desired, to control valve 40 directly.

Figure 5:
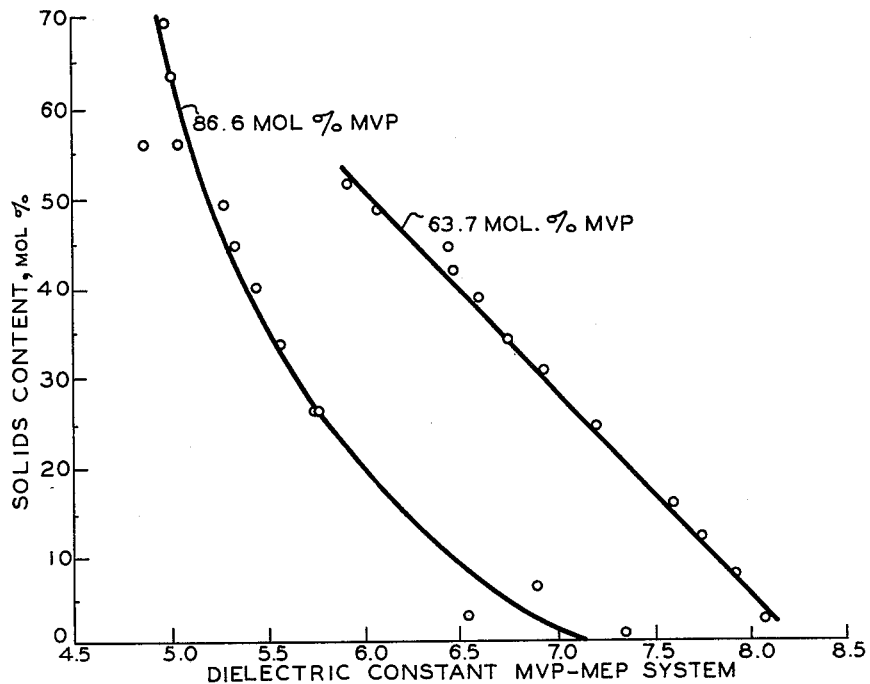
FIGURE 5 is a graph illustrating the ralationship between dielectric constant and solids content of a 2-methyl-5-vinylpyridine feed stream.

As discussed hereinbefore, the control method of this invention is dependent upon the discovery that the dielectric properties of a slurry are a function of the solids content of that slurry. In FIGURE 5 of the drawing, two curves are shown which illustrate the relationship between dielectric constant and solids content of two 2-methyl-5-vinylpyridine feed streams. The dielectric constant measurements were obtained by using a Sargent Chemical Oscillometer, Model V, manufactured by E. H. Sargent & Company, Chicago, Illinois. Similar measurements have been obtained in the case of other systems, including systems containing normal paraffins, such as dodecane or tridecane, and systems containing aromatics, such as para-xylene. In the operation of the control system, rate of flow controller 77 is given an initial setting which provides the coolant circulation rate necessary to obtain a slurry having a desired solids content. It is seen from FIGURE 5 that a slurry having a certain solids content has a specific dielectric constant. If the dielectric constant of the slurry changes, controller 76 operates as as to reset rate of flow controller 77 which in turn adjusts valve 40, thereby altering the rate of flow of the coolant through the chiller jacket. For example, if the measured dielectric constant decreases, indicating an increase in solids content, valve 40 is closed by a preselected amount, thereby cutting back on the coolant circulation rate. Conversely, if the measured dielectric constant increases, indicating a decrease in the solids content of the slurry, valve 40 is opened by a preselected amount so as to increase the coolant circulation rate. It is to be understood that with certain systems the dielectric constant of the slurry increases with an increase in solids content and decreases with a decrease in solids content.

By proceeding as described hereinbefore, it is possible to supply a slurry having a desired constant solids content to the upper end of purification column 10. Upon introduction into column 10, the slurry is moved downwardly by means of piston 13 into filter section 21. Piston 13 is forced downwardly and upwardly by means of hydraulic piston 16 which is moved in response to hydraulic fluid introduced into and withdrawn from hydraulic cylinder 17 through lines 18 and 19. By operating in this manner, piston 13 on its compression stroke forces crystals downwardly through column 10 while on its back stroke crystal slurry is allowed to pass into the column from chiller 34.

Within filter section 21 mother liquor is separated from the crystals and removed from the column through line 24. The crystals thereafter continue their movement as a uniform mass downwardly through the column as a result of the force asserted thereon by piston 13. Crystals on approaching the end of column 10 enter the melting zone maintained in the end of the column by heating means 27. The melting zone is maintained at a temperature at least as high as the melting point of the crystals by continuously circulating a heat exchange medium through the coil of the heating means. On reaching the melting zone, at least a portion of the crystals are melted, and a portion of the resulting melt is displaced upwardly as a reflux stream into the downwardly moving mass of crystals. The reflux stream on contacting the crystals upstream crystalwise of the melting zone displace occluded impurities from the crystals by refreezing thereon. A liquid stream comprising displaced impurities is removed from column 10 through filter section 21 by means of line 24. A substantially pure product in the form of melt or a mixture of melt and crystals is withdrawn from the melting zone through line 29.

While the instant invention has been described in conjunction with a particular crystal purification column, it is not intended to so limit the invention. The invention is broadly applicable to any purification column which utilizes a displaced reflux stream to obtain a high purity product. One type of crystal purification apparatus with which the instant invention can be advantageously used is described in copending U.S. patent application Serial No. 494,866, filed by R. W. Thomas on March 17, 1955, now U.S. Patent No. 2,854,494. Furthermore, while the apparatus of FIGURE 1 has, for the sake of clarity of understanding, been illustrated and described as occupying a substantially vertical position, it is not intended to so limit the invention. It is to be understood that the apparatus can be otherwise disposed without departing from the spirit or scope of the invention. Thus, the separation and purification column can be positioned horizontally or the column can be operated vertically with the melting zone in the top of the column rather than in the bottom as illustrated.

A more comprehensive understanding of the invention may be obtained by reference to the following illustrative example which is not intended, however, to be unduly limitative of the invention.

Example

A feed material containing about 86.6 mol percent 2-methyl-5-vinylpyridine (MVP), the remainder being primarily 2-methyl-5-ethylpyridine (MEP), is charged to the chiller of fractional crystallization apparatus similar to that of FIGURE 1 at a temperature of about 70° F and a rate of 19,965 pounds per day. In this example, propane is used as the cooling medium and valve 40 is positioned in the coolant outlet line in order to control the rate of evaporation of this material. It is desired to control the operation of chiller so that the slurry upon introduction into the separation and purification column contains 40 mol percent solids.

As seen from an examination of FIGURE 5, an MVP slurry obtained from the above-mentioned feed and having a solids content of 40 mole percent has a dielectric constant of about 5.4. Rate of flow controller 77 is given an initial setting such that the amount of propane evaporated gives the refrigeration required to produce a slurry containing 40 mol percent solids. The index of potentiometer controller 76 is given a dielectric constant setting of 5.4, which setting corresponds to the setting given to the rate of flow controller. During operation, the refrigeration requirements of the chiller are continuously adjusted so that the solids content of the slurry remains substantially constant at 40 mol percent. If the solids content of the slurry deviates from this value, the dielectric constant of the material also changes and there is an electrical unbalance in the bridge circuit shown in FIGURE 4. The output air pressure from the potentiometer controller also changes, thereby resetting the flow controller which in turn adjusts valve 40 in line 41. When the dielectric constant of the slurry decreases indicating an increase in the solids content, the rate of flow controller is reset so that it operates to cut back on the opening of valve 40, thereby decreasing the rate of evaporation of the propane. Conversely, if the dielectric constant of the slurry increases, indicating a decrease in the solids content, the rate of flow controller is reset so that it operates to increase the opening of valve 40 and thereby permit a greater rate of propane evaporation. When the dielectric constant of the slurry returns to its original value of 5.4, the potentiometer controller operates to reset the rate of flow controller to its original setting.

The slurry containing 40 mol percent solids is passed from the chiller into the crystal separation and purification column. The slurry is moved through the column by means of a piston into the filter section where mother liquor containing 75 weight percent MVP is recovered at the rate of 9,982 pounds per day. The mass of crystals, as a result of the force asserted thereon by the column piston, moves through the column toward the melting zone maintained in the end of the column at a temperature of 20° F., which is above the melting point of the MVP crystals. A stream containing 95 mol percent MVP is withdrawn from the melting zone at the rate of 9,983 pounds per day as the product of the process.

It will be apparent to those skilled in the art that various modifications of the invention can be made upon study of the accompanying disclosure. Such modifications are believed to be clearly within the spirit and scope of the invention.

We claim:

1. In fractional crystallization apparatus comprising, in combination, an elongated purification column, means for melting crystals associated with one end of said column and conduit means for withdrawing product therefrom, crystal forming means having coolant inlet means and coolant outlet means connected thereto, feed inlet means connected to said crystal forming means, slurry withdrawal means connected to said crystal forming means, and to the end portion of said column opposite from that with which said crystal melting means is associated, and filtering means in said column between said crystal melting means and the point of connection of said slurry withdrawal means to said column, the improvement comprising means associated with said slurry withdrawal means for measuring in situ the dielectric properties of slurry passed therethrough and producing an output as a function of said dielectric properties; and means responsive to said output for controlling the rate of flow of coolant through one of said coolant inlet and coolant outlet means connected to said crystal forming means and thus maintain a substantially constant crystal content in said slurry.

2. In fractional crystallization apparatus including a crystallization chamber with feed inlet means and crystal slurry outlet means and means for passing cooling medium in heat exchange relation with the contents of said chamber, the improvement comprising, in combination, a dielectric probe within said chamber and positioned to be in contact with crystal slurry formed in said chamber and adjacent said outlet means, a motor valve associated with said means for passing cooling medium to control the flow rate of said cooling medium and hence the amount of cooling in said chamber, and control means operatively connected to both said motor valve and said dielectric probe, said control means serving to operate said motor valve in response to signals produced through said dielectric probe.

3. In fractional crystallization apparatus including a crystallization chamber having a feed inlet and a crystal slurry outlet, a channel for carrying coolant in indirect heat exchange with fluid in said chamber, and a conduit connected to said channel and through which said coolant must pass, the improvement comprising, in combination, a dielectric probe within said chamber and positioned to be in contact with crystal slurry formed in said chamber and adjacent said outlet, electrical circuit means including a power source for producing a signal as a function of the dielectric value of slurry contacting said probe, a motor valve in said conduit, and control means operating said motor valve in response to said signal.

4. Crystallization apparatus comprising, in combination, a chamber having inlet and outlet means through which can be passed material having a crystallizable component, means for removing heat from material within said chamber to form a crystal slurry, means for measuring the dielectric properties of said slurry in said outlet, and control means connected to said means for removing heat and to said means for measuring dielectric properties making heat removal by the former responsive to variations in signal generated by the latter.

5. Crystallization apparatus comprising, in combination, a crystallization chamber, means for removing heat from material in said chamber to form a crystal slurry, means for sensing the dielectic properties of said slurry, and control means operatively connecting said heat removing means and said dielectric sensing means and regulating heat removal in response to variations in dielectric properties of said slurry.

6. In combination with a crystal purification column connected to a crystallization means through a slurry conduit, said column comprising outlet means at the opposite end from said conduit, melting means at said opposite end adjacent said outlet, and filter means in said column intermediate said conduit and said melting means, said crystallization means having heat removal means associated therewith, the improvement which comprises, in combination:

a dielectric probe extending into said slurry conduit, means connected with said probe to detect variations in the dielectric constant of slurry within said conduit and to generate a signal proportional to said dielectric constant, and means to control said heat removal means in response to variations in said signal and thus maintain said signal substantially constant.

References Cited by the Examiner

UNITED STATES PATENTS

| | | | |
|---|---|---|---|
| 1,970,613 | 8/34 | McDill | 165—39 |
| 2,472,409 | 6/49 | Eisner | 165—39 |
| 2,572,253 | 10/51 | Fellows et al. | 165—39 |
| 2,577,612 | 12/51 | Fay | 210—96 X |
| 2,599,583 | 6/52 | Robinson et al. | 210—96 X |
| 2,632,308 | 3/53 | Englehardt | 62—139 |
| 2,752,230 | 6/56 | Findlay | 23—273 |
| 2,885,431 | 5/59 | Tarr | 260—674 X |
| 2,900,334 | 8/59 | Miller | 210—96 |

ROBERT A. O'LEARY, *Primary Examiner.*

GEORGE D. MITCHELL, *Examiner.*